US011865663B2

(12) United States Patent
Shuai et al.

(10) Patent No.: US 11,865,663 B2
(45) Date of Patent: Jan. 9, 2024

(54) OPTICAL SURFACE POLISHING

(71) Applicants: George Shuai, Centerville, OH (US); Gwo Shin Swei, Vandalia, OH (US)

(72) Inventors: George Shuai, Centerville, OH (US); Gwo Shin Swei, Vandalia, OH (US)

( * ) Notice: Subject to any disclaimer, the term of this patent is extended or adjusted under 35 U.S.C. 154(b) by 1147 days.

(21) Appl. No.: 16/408,571

(22) Filed: May 10, 2019

(65) Prior Publication Data

US 2019/0344395 A1 Nov. 14, 2019

Related U.S. Application Data

(60) Provisional application No. 62/669,676, filed on May 10, 2018.

(51) Int. Cl.
| | |
|---|---|
| *B24D 3/10* | (2006.01) |
| *B24B 13/02* | (2006.01) |
| *B24B 13/00* | (2006.01) |
| *B24B 13/01* | (2006.01) |
| *B24B 37/24* | (2012.01) |
| *B24D 3/00* | (2006.01) |
| *C09K 3/14* | (2006.01) |
| *C09G 1/02* | (2006.01) |

(52) U.S. Cl.
CPC ............. *B24B 13/01* (2013.01); *B24B 13/00* (2013.01); *B24B 13/02* (2013.01); *B24B 37/24* (2013.01); *B24D 3/007* (2013.01); *B24D 3/10* (2013.01); *C09G 1/02* (2013.01); *C09K 3/1409* (2013.01)

(58) Field of Classification Search
CPC ....... B24B 13/00; B24B 13/01; B24B 13/012; B24B 13/02; B24B 37/22; B24B 37/24; B24D 3/007; B24D 3/10; B24D 3/22; B24D 3/26; B24D 3/28; B24D 3/32; B24D 11/001; C09K 3/14; C09K 3/1409; C09K 3/1436
USPC ............. 451/42, 530, 539, 921; 51/295, 309
See application file for complete search history.

(56) References Cited

U.S. PATENT DOCUMENTS

| | | | | |
|---|---|---|---|---|
| 3,225,497 A | * | 12/1965 | Brandt .................... | B24B 13/02 451/490 |
| 4,576,612 A | * | 3/1986 | Shukla .................... | B24B 13/01 451/526 |
| 4,733,502 A | | 3/1988 | Braun | |

(Continued)

FOREIGN PATENT DOCUMENTS

| | | | |
|---|---|---|---|
| EP | 0650803 A1 | * | 5/1995 |
| EP | 0665308 A1 | * | 8/1995 |

(Continued)

OTHER PUBLICATIONS

Gagliardi, J.J. and Buley, T.W.; 3M SlurryFree™ CMP "Fixed Abrasives for Direct HDP STI CMP"; Jun. 2001.

(Continued)

*Primary Examiner* — Eileen P Morgan
(74) *Attorney, Agent, or Firm* — Thomas E. Lees, LLC (57) ABSTRACT

A polishing pad or polishing tape with abrasive particles (e.g., diamond, aluminum-oxide, silicon-carbide, etc.) having an average particle size of between approximately 0.5 micrometers (μm) and 5.0 μm, which are strongly adhered with water-insoluble binders to a flexible and lens-conformable substrate having a cushion so that there is little-to-no shedding or release of the particles from the substrate.

12 Claims, 9 Drawing Sheets

(56) References Cited

U.S. PATENT DOCUMENTS

| | | | | |
|---|---|---|---|---|
| 5,387,457 A | * | 2/1995 | Sato | B24B 21/16 |
| | | | | 428/932 |
| 5,624,766 A | * | 4/1997 | Moriguchi | C22C 29/08 |
| | | | | 428/548 |
| 5,632,668 A | * | 5/1997 | Lindholm | B24D 3/28 |
| | | | | 451/526 |
| 5,910,471 A | * | 6/1999 | Christianson | B24D 11/00 |
| | | | | 451/529 |
| 5,989,111 A | | 11/1999 | Lamphere et al. | |
| 6,258,136 B1 | * | 7/2001 | Kinisky | C09G 1/02 |
| | | | | 51/298 |
| 6,354,929 B1 | * | 3/2002 | Adefris | C03C 19/00 |
| | | | | 451/527 |
| 6,447,852 B1 | * | 9/2002 | Gordeev | C22C 26/00 |
| | | | | 75/751 |
| D603,884 S | | 11/2009 | Michalec | |
| 8,968,435 B2 | | 3/2015 | Manning et al. | |
| 9,321,947 B2 | | 4/2016 | Manning et al. | |
| 2010/0234207 A1 | * | 9/2010 | Shikata | F16C 33/043 |
| | | | | 501/127 |
| 2019/0344395 A1 | * | 11/2019 | Shuai | B24D 3/007 |

FOREIGN PATENT DOCUMENTS

| | | | | | |
|---|---|---|---|---|---|
| GB | | 2033360 A | * | 5/1980 | C09K 3/1436 |
| GB | | 2507566 A | * | 5/2014 | B22F 7/06 |
| WO | WO-0145903 A1 | | * | 6/2001 | B24B 19/028 |
| WO | WO-02092286 A1 | | * | 11/2002 | B24B 19/226 |
| WO | WO-2013149197 A1 | | * | 10/2013 | B24B 13/01 |

OTHER PUBLICATIONS

Suratwala, T.; "Lecture 13: Glass Finishing (Grinding & Polishing)"; Glass Processing Course (Lehigh University); International Materials Institute for New Functionality in Glass (IMI-NFG); Lawrence Livermore National Laboratory; Mar. 5, 2015.

* cited by examiner

OPTICAL SURFACE POLISHING

CROSS-REFERENCE TO RELATED APPLICATION

This application claims the benefit of U.S. Provisional Patent Application Ser. No. 62/669,676, filed May 10, 2018, entitled "OPTICAL SURFACE POLISHING," the disclosures of which are hereby incorporated by reference.

BACKGROUND

The present disclosure relates generally to lens manufacturing and, more particularly, to optical surface polishing.

Conventional lens polishing processes employ liquid slurries with polishing particles that are suspended in an aqueous solution. The slurry is applied to the interface between a surface of the lens and an associated polishing pad or lap. During the polishing process, the suspended particles serve to remove small scratches on the surface of the lens, and provide a smooth, optically clear lens.

BRIEF SUMMARY

The present disclosure provides a slurry-free optical surface polishing process and an optical surface polishing pad.

Thus, an embodiment comprises a polishing pad or polishing tape with abrasive particles (e.g., diamond, aluminum-oxide, silicon-carbide, etc.) having an average particle size of between approximately 0.5 micrometers ($\mu m$) and 5.0 $\mu m$, which are strongly adhered with water-insoluble binders to a flexible and lens-conformable substrate with a cushion so that there is little-to-no shedding or release of the particles from the substrate.

Another embodiment comprises a process that uses a polishing pad or polishing tape with abrasive particles having an average particle size of between approximately 0.5 $\mu m$ and 5.0 $\mu m$, which are strongly adhered with water-insoluble binders to a flexible and lens-conformable substrate with a cushion.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

A lens-manufacturing process typically requires multiple steps. Initially, in a conventional process, sandpaper/lapping film is used to mechanically sand a lens to rough in a prescription. The conventional process typically requires tooling for every prescription to mechanically remove material from the lens to generate an approximate geometry of a desired prescription. Comparatively, in a digital process, the initial step is to cut the prescription into a lens using a diamond cutter and water.

A fining step can then be implemented. Fining uses relatively fine abrasive particles compared to a conventional first step, to remove deep scratches, and to correct slight errors in a curve of the lens to generate the desired prescription.

Conventionally, lens polishing processes employ liquid slurries with polishing particles that are suspended in an aqueous solution. Unlike water or water-miscible solvents, slurries have suspended particles, which result in various manufacturing inconveniences.

In conventional processing, the fining step is remarkably different from the polishing step and, thus, abrasives that are used for fining cannot be used for polishing, and vice versa.

Aspects of the present disclosure are directed specifically to the polishing step. Conventional liquid slurry has a number of disadvantages, including the need to ship, store, and manage large quantities of liquid, which is a heavy and relatively expensive consumable. Moreover, because of the suspended particles, the waste liquid is not suitable for conventional disposal using a common drain to a sewer line from a local sewer system.

To overcome these and other deficiencies, this disclosure provides for a slurry-free lens-polishing process that uses water or a water-miscible solvent (without suspended particles other than trace amounts of particles that result from the polishing process). The slurry-free polishing process uses a polishing pad, which has both fine abrasive particles (between approximately 0.5 micrometers ($\mu m$) and approximately 5.0 $\mu m$ in size) and coarse abrasive particles (greater than approximately 5.0 $\mu m$ in size). Unlike prior systems, both the fine abrasive particles and the coarse abrasive particles are bound to a substrate using a water-insoluble binder. By way of example, in one embodiment, the particles are polymer-coated particles that are affixed onto the substrate. The substrate is, preferably, a flexible, cushioned substrate that conforms to a shape of a lens.

Having provided a broad technical solution to a technical problem, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

Figure 1A:
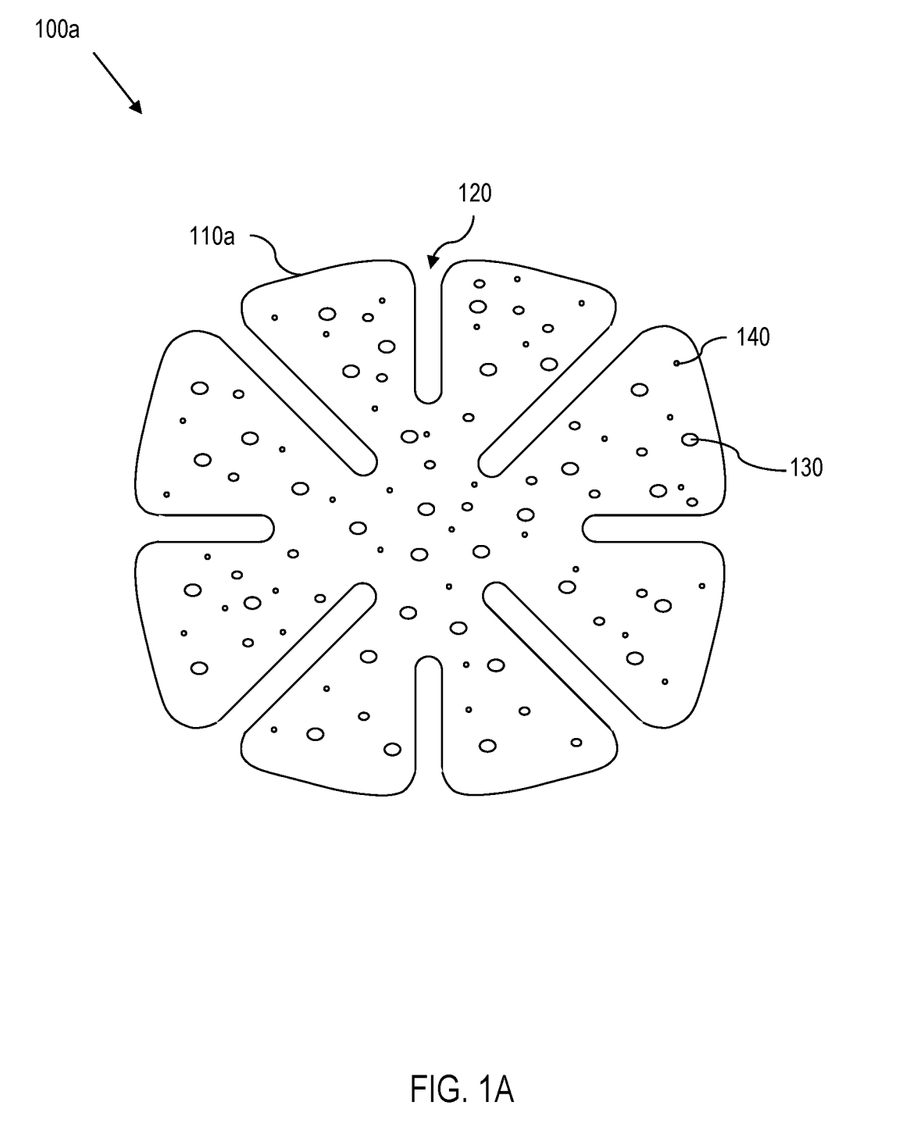
FIG. 1A is a plan view of one embodiment of a polishing pad.
Figure 1B:
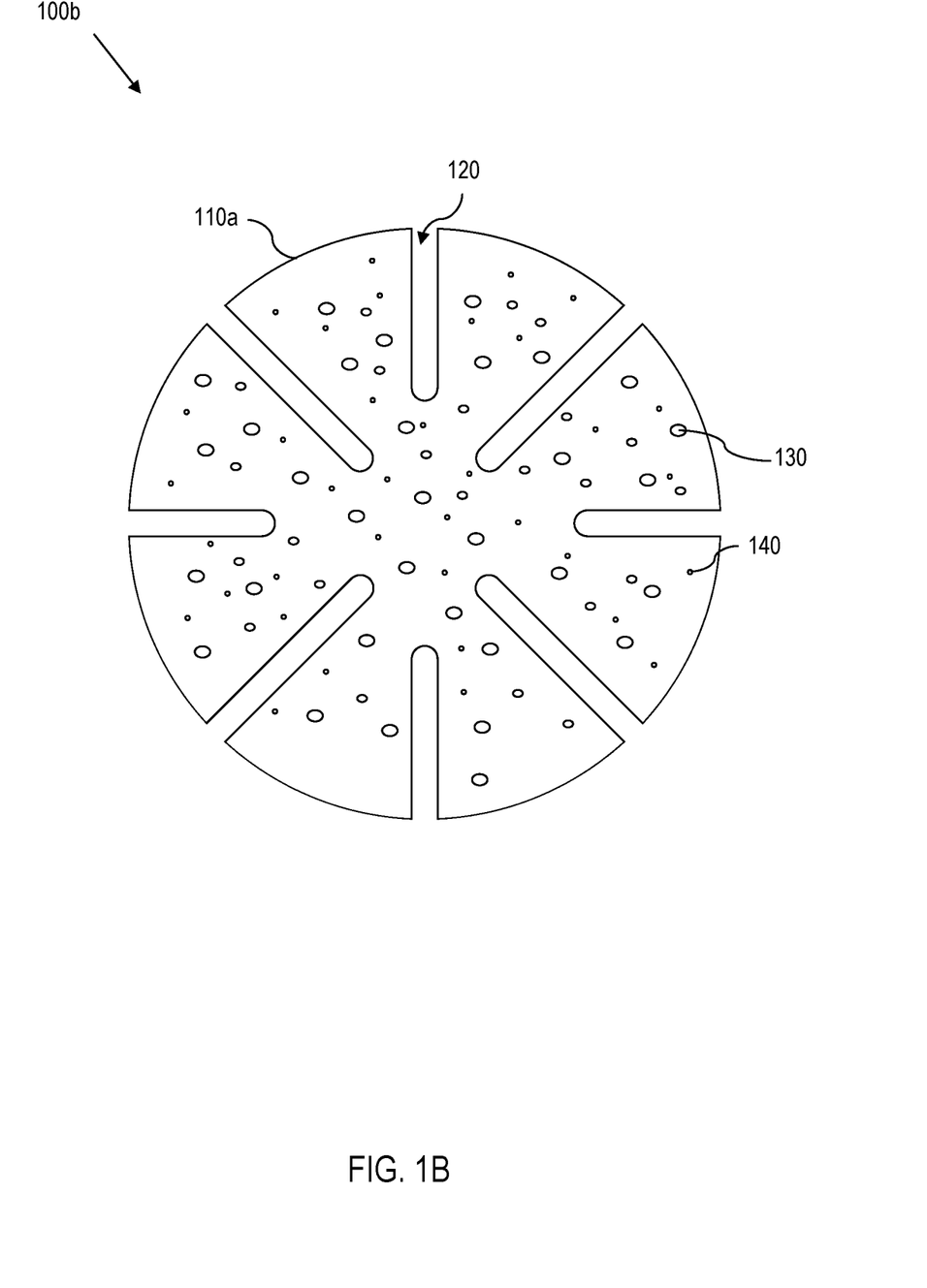
FIG. 1B is a plan view of another embodiment of a polishing pad.
Figure 1C:
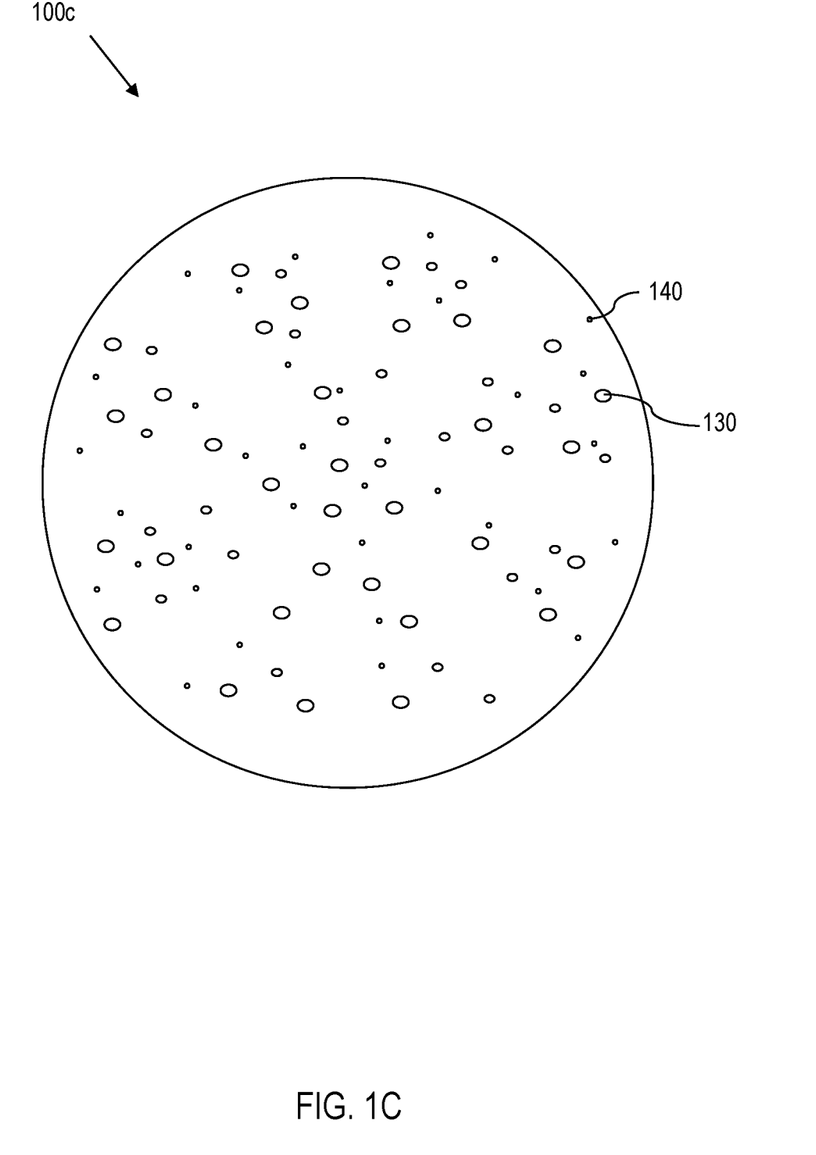
FIG. 1C is a plan view of yet another embodiment of a polishing pad.

FIGS. 1A, 1B, and 1C (collectively designated as FIG. 1) are plan views of several embodiments of a polishing pad

100a, 100b, 100c (collectively designated herein as 100). As shown in FIG. 1A, the polishing pad 100a comprises multiple petals 110, which are separated by cuts or slots 120. Additionally, the polishing surface of the polishing pad 100a comprises both coarse abrasive particles 130 and fine abrasive particles 140. When polishing a lens, the polishing pad 100a is affixed to a lens-polishing apparatus. Once affixed, the lens (not shown) is polished with the polishing pad 100a in the absence of a slurry. Rather, water or water-miscible solvent (without suspended particles) can be used. As such, any residual water (with only trace amounts of particulate matter resulting from the polishing process) can be properly disposed down a drain or a sewer line. As shown in FIGS. 1B and 1C, the polishing pad 100b, 100c can be adapted to various different shapes, such as, for example, a different petal design polishing pad 100b or a circular design polishing pad 100c.

Figure 2:
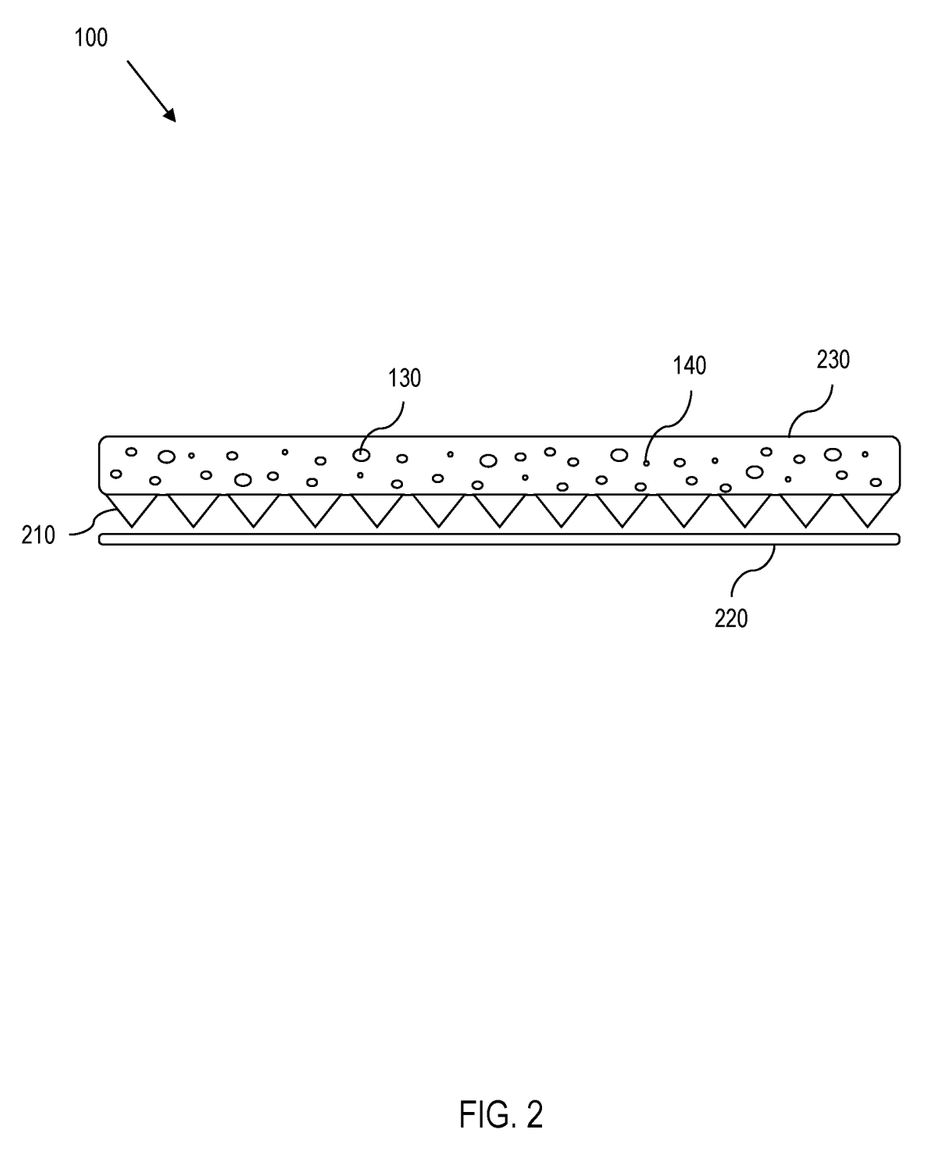
FIG. 2 is an enlarged view showing a cross-section of one embodiment of a polishing pad.

Turning now to FIG. 2, shown is an enlarged view of one cross-section of the polishing pad 100 of FIG. 1. Polishing pad 100 comprises a substrate 210 that is conformable to a lens. Insofar as substrates are known in the art, only a truncated discussion of the substrate 210 is provided. On one side of the substrate 210 is a flexible cushion 220 that permits an appropriate amount of pressure to be applied to the lens. In some embodiments, the cushion 220 responds to pressure as it interfaces with the lens, thereby allowing for a more uniform application of pressure across an entire surface of the lens. Additionally, for some embodiments, the substrate 210 and cushion 220 are large enough to permit the perimeter of the polishing pad 100 to travel outside of the perimeter of the lens (also designated as overhang). The overhang allows the polishing pad 100 to polish up to the very edge (or perimeter) of the lens.

Continuing with FIG. 2, coarse abrasive particles 130 and fine abrasive particles 140 (collectively designated as abrasive particles 130, 140) are bound to the substrate 210 using a water-insoluble binder 230. Specifically, the fine abrasive particles 140 each have a particle size that is between approximately 0.5 micrometers (μm) and approximately 5.0 μm, while the coarse abrasive particles 130 each have a particle size that is greater than approximately 5.0 μm.

Unlike other polishing pads, which employ water-soluble binders, the water-insoluble binder 230 of FIG. 2 results in a strong adherence of the abrasive particles 130, 140 with the substrate 210, thereby reducing or eliminating any release or shedding of particles 130, 140 during polishing in the presence of water (or other water-miscible solution). For some embodiments the water-insoluble binder 230 comprises an epoxy, while for other embodiments the water-insoluble binder 230 comprises a polyurethane.

Next, unlike conventional polishing pads, the specific embodiment of the polishing pad 100 in FIGS. 1 and 2 require a very specific proportion of fine abrasive particles 31 to coarse abrasive particles 32, namely, at least ninety-five percent (95%) fine abrasive particles 140 and at most five percent (5%) coarse abrasive particles 130. In other words, although prior polishing pads with an average particle size of between 0.5 μm and 15 μm are known, what was previously undisclosed and not suggested is the separation between fine abrasive particles 140 (0.5 μm<size<5.0 μm) and coarse abrasive particles 130 (size>5.0 μm), along with their specific proportions (fine:coarse=20:1). Depending on the materials used for the lens, the abrasive particles 130, 140 comprise diamond particles (approximately 7000 (~7000) to 8000 on the Knoop hardness scale and ~10 on the Moh's hardness scale), aluminum-oxide particles (~2100 to 3000 Knoop; ~9 Moh), silicon-carbide particles (~2500 to 3000 Knoop; ~9 to ~10 Moh), cerium-oxide particles (~7 Moh), other suitable particles, or any permutation or combination of such abrasive particles 130, 140.

As one can appreciate from the embodiments of FIGS. 1 and 2, the slurry-free lens-polishing process that uses a polishing pad with a specific distribution of fine abrasive particles 140 and coarse abrasive particles 130 provides greater control during lens polishing, thereby resulting in a more-efficient polishing process than what can be achieved with an unspecified particle distribution.

Figure 3A:
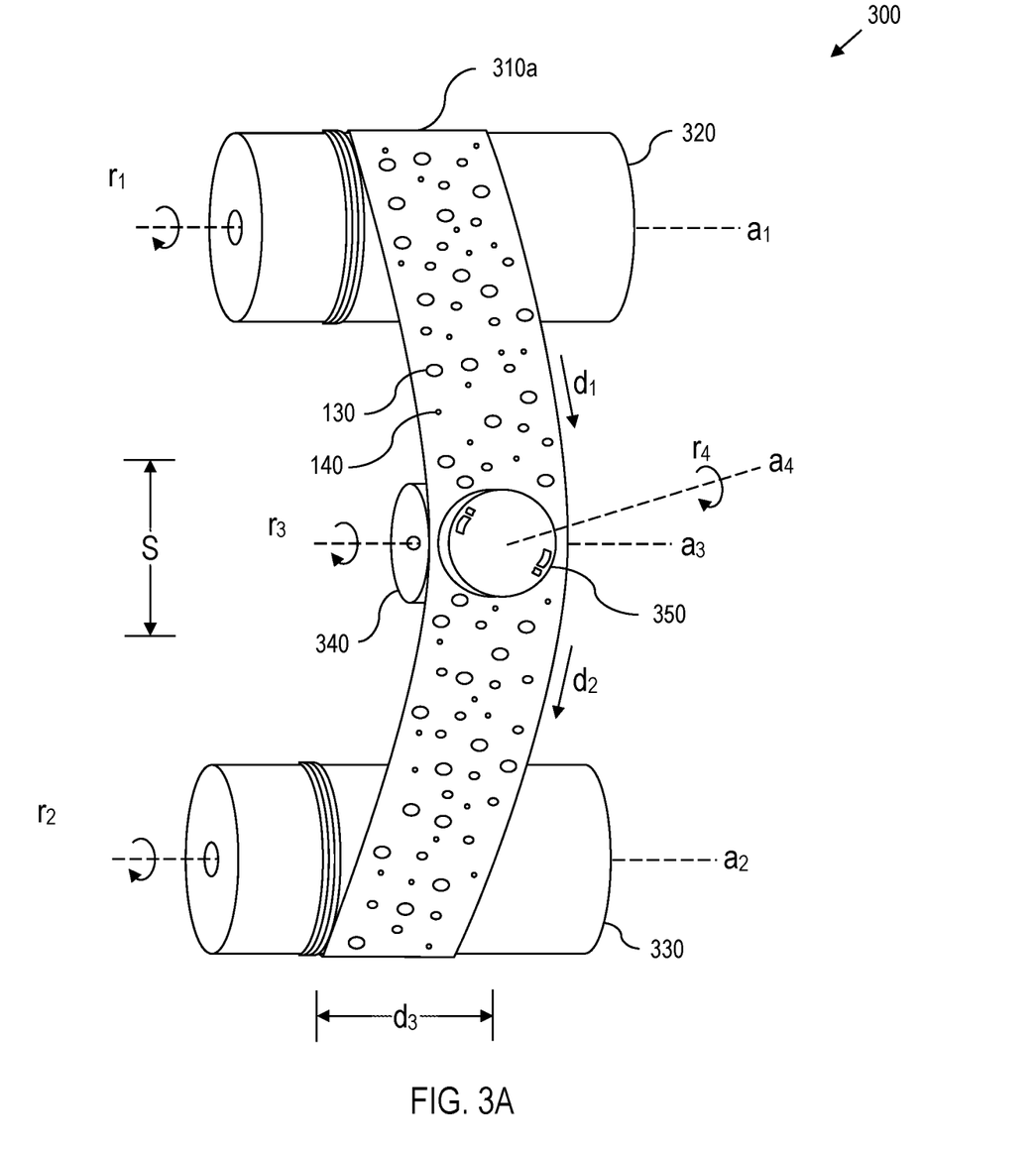
FIG. 3A is a perspective view of one embodiment of a polishing system that uses a polishing tape.
Figure 3B:
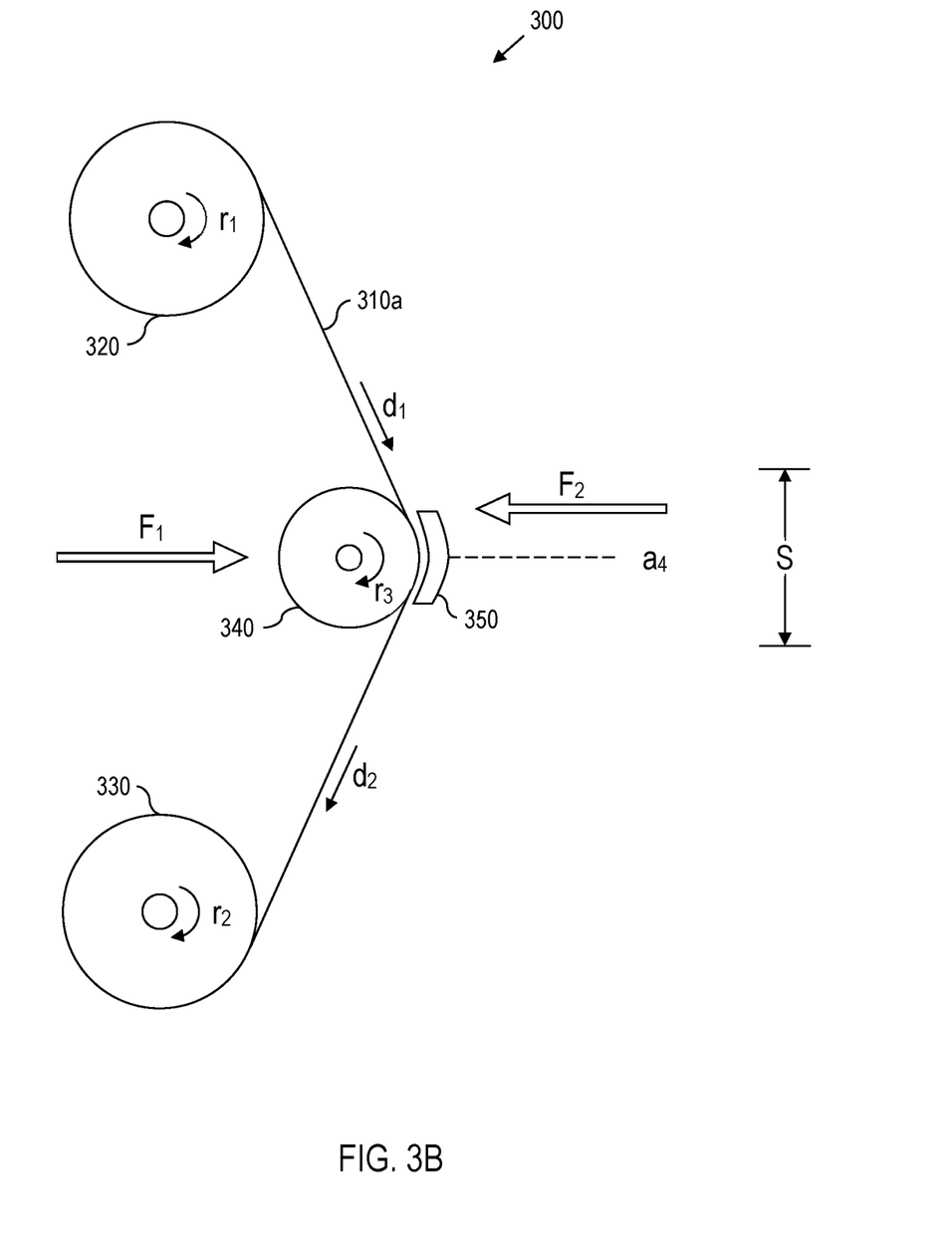
FIG. 3B is a side view of the polishing system of FIG. 3A.

In addition to teaching a polishing pad 100, this disclosure provides an embodiment of a polishing system 300 in FIGS. 3A and 3B (collectively, FIG. 3), which uses a polishing tape 310a. Similar to the polishing pads 100, the polishing tape 310a comprises both coarse abrasive particles 130 and fine abrasive particles 140.

As shown in FIG. 3, unused polishing tape 310a is fed from a feed roller 320, which rotates about a feed roller axis (a1) at a feed roller rotation rate (r1), thereby feeding the polishing tape 310 in a feed direction (d1). Correspondingly, the polishing tape 310a (after being used for polishing) is taken up by a take-up roller 330, which rotates about a take-up roller axis (a2) at a take-up roller rotation rate (r2), thereby taking up the used polishing tape in a take-up direction (d2). Preferably, to reduce complications that may arise during the feed and take-up of the polishing tape 310a, the radius of the feed roller 320 matches the radius of the take-up roller 330.

As the polishing tape 310a is advanced from the feed roller 320 to the take-up roller 330, a force (F1) is applied to the confirmable backing 340 at the underside of the polishing tape 310a, while a countervailing force (F2) is applied to a lens 350. These a combination of the forces (F1, F2) maintains contact between the polishing tape 310a and the lens 350. By way of example, a preferable range for the total combined force applied between the polishing tape 310 and the lens 350 is between approximately 50 Newtons (N) and approximately 500 N.

For some embodiments, the polishing system 300 provides a continuous feed of the polishing tape 310a and, thus, the polishing tape 310a advances at a pre-determined rate. For other embodiments, the polishing system 300 advances the polishing tape 310a in discrete step length (S) for each lens 350 being polished.

In the embodiment where the polishing tape 310a advances continuously at a constant feed rate, the conformable backing 340 rotates about a backing axis (a3) at a backing rotation rate (r3) that depends on the feed rate of the polishing tape 310a. The conformable backing 340 conforms to the shape of the lens 350 as a function of the force (F1) applied to the conformable backing 340. By way of example, for a continuous feed system, a preferable range for the feed rate for the polishing tape 310a is between approximately zero (0) millimeters-per-minute (mm/min) and approximately 100 mm/min As one can appreciate, if the polishing tape 310a advances continuously without lateral deviation, then it is possible for grooves or linear scratches to form on the lens 350 as the abrasive particles 130, 140 advance along the surface of the lens 350. To mitigate for scratching or grooving, the polishing system 300 oscillates in a lateral direction (d3) while the polishing tape 310a advances from the feed roller 320 to the take-up roller 330. The lateral direction (d3) is perpendicular to both the feed direction (d1) and the take-up direction (d2). By way of example, a preferable range for the side-to-side oscillation (d3) is between approximately 300 strokes-per-minute and 1400 strokes-per-minute. Insofar as oscillators, oscillating motors, and other known oscillating devices are known in the art, only a truncated discussion of the oscillation mechanism is provided with reference to FIG. 3.

To further mitigate scratching or grooving, for some embodiments the lens 350 rotates about a lens rotation axis (a4) at a lens rotation direction (r4). Preferably, the lens rotation axis (a4) is substantially perpendicular to the backing axis (a3), thereby permitting a relatively uniform pressure between the abrasive surface of the polishing tape 310a and the polishing surface of the lens 350. Insofar as motors and other known rotating devices are known in the art, only a truncated discussion of the rotating mechanism is provided with reference to FIG. 3.

For the embodiment of the polishing system 300 in which the polishing tape 310a advances in discrete steps (S), it should be understood that the lens 350 contacts the polishing tape 310a after an unused portion of the polishing tape 310a is advanced to a suitable position. Thus, at each discrete step (S), the lateral oscillation (D3) would be optional, therefore the mechanism by which the lens 350 is polished would be by rotation (r4) about the lens rotation axis (a4).

Figure 4A:
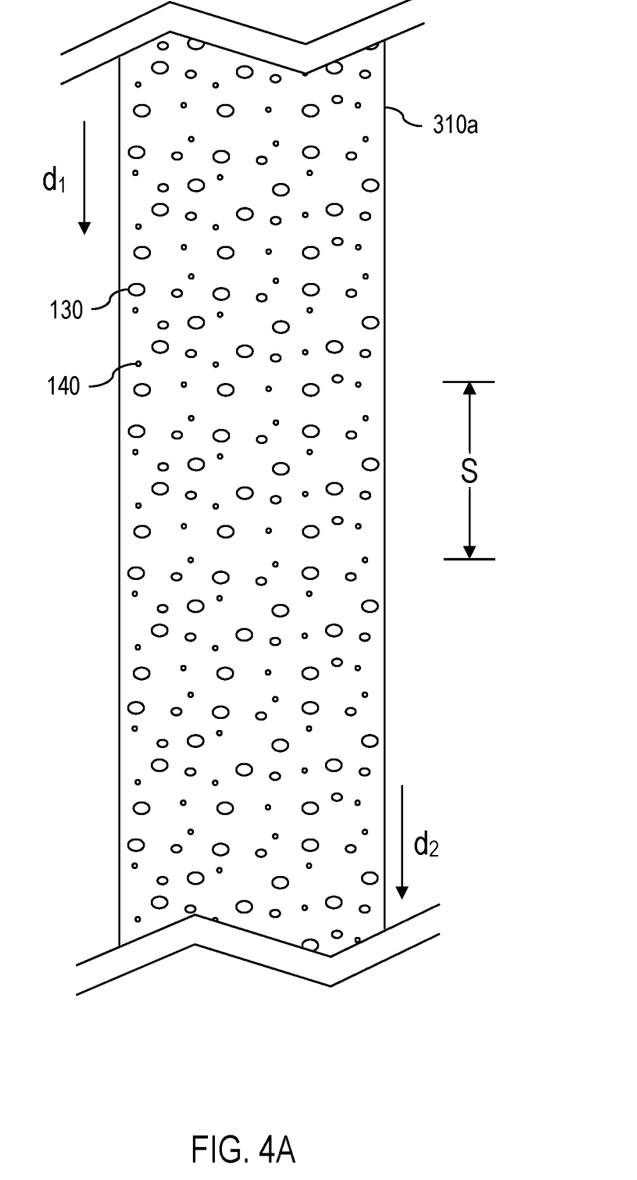
FIG. 4A is a front view of one embodiment of a polishing tape.
Figure 4B:
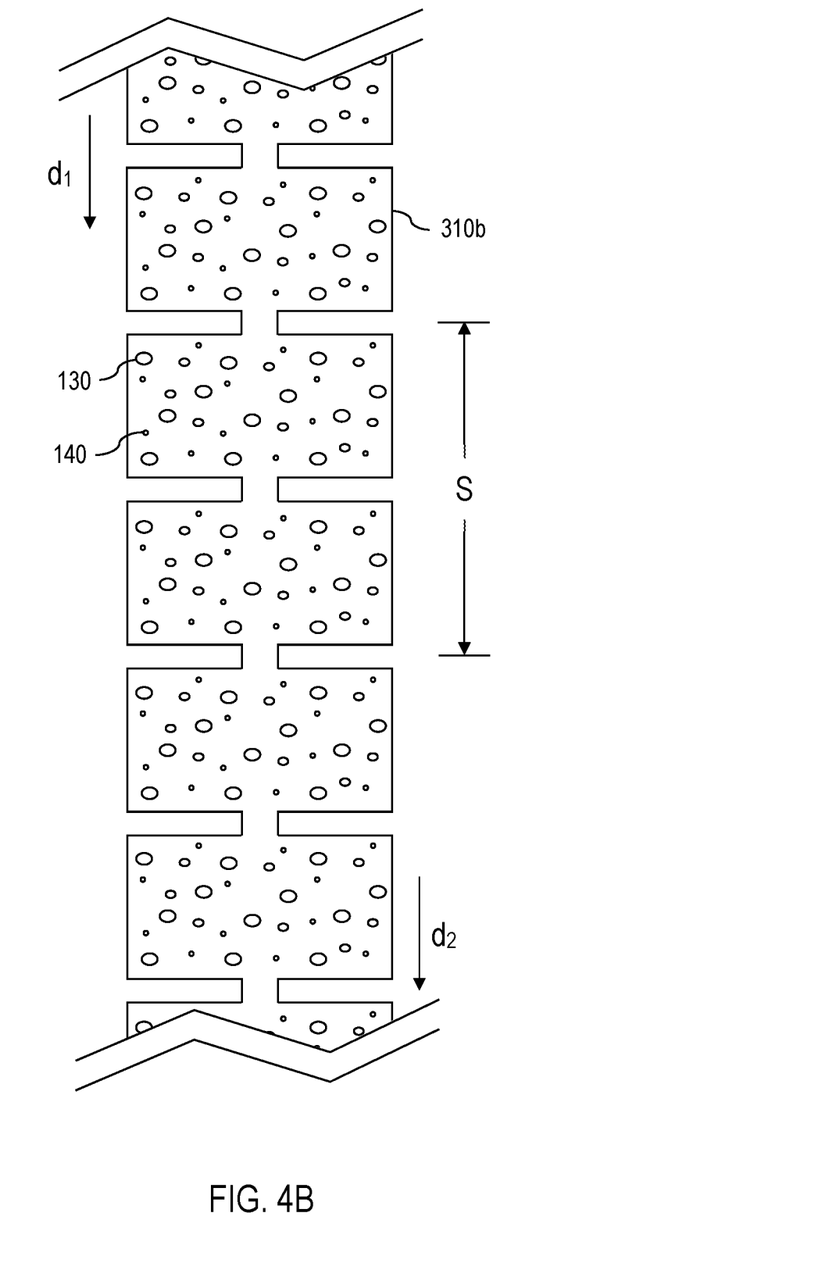
FIG. 4B is a front view of another embodiment of a polishing tape.
Figure 4C:
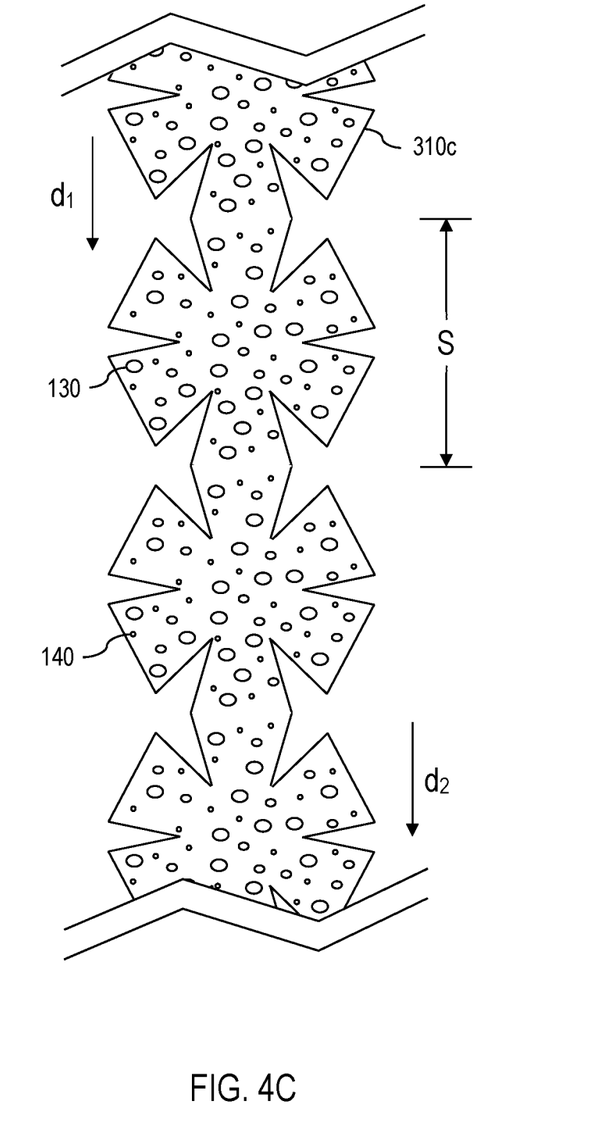
FIG. 4C is a front view of yet another embodiment of a polishing tape.

Additionally, for polishing systems 300 in which the polishing tape 310a advances in discrete steps (S), different types of polishing tapes can be used to polish the lens 350. Several embodiments of polishing tapes are shown in FIGS. 4A, 4B, and 4C (collectively, FIG. 4). Specifically, FIG. 4A shows a front view of one embodiment of a straight polishing tape 310a, such as that shown in FIG. 3. As noted above, the polishing tape 310 comprises both coarse abrasive particles 130 and fine abrasive particles 140. Insofar as the proportions, sizes, hardness values, etc. of the abrasive particles 130, 140 are discussed above with reference to FIGS. 1 and 2, only a truncated discussion of these properties is provided with reference to FIG. 4.

Continuing, FIG. 4B shows a front view of another embodiment of a polishing tape 310b. Unlike the polishing tape 310a of FIG. 4A, the polishing tape 310b of FIG. 4B comprises slots along the length of the polishing tape 310b, thereby providing a separation in certain sections of the polishing tape 310b. Consequently, when a curved lens 350 contacts the polishing tape 310b, the separations reduce or eliminate folding or creasing in the polishing tape 310b.

In yet another embodiment, shown in FIG. 4C, the polishing tape 310c comprises petals similar to the petals shown in FIGS. 1A and 1B. Insofar as petals are discussed with reference to FIGS. 1A and 1B, only a truncated discussion of this petal embodiment 310c is provided with reference to FIG. 4C.

As one can appreciate from the embodiments of FIGS. 1 through 4, the slurry-free lens-polishing process that uses a polishing pad or a polishing tape provides a more environmentally-friendly alternative to slurry-based polishing of lenses. Also, providing a specific distribution of fine abrasive particles 140 and coarse abrasive particles 130 results in greater control during lens polishing, thereby resulting in a more-efficient polishing process than what can be achieved with an unspecified particle distribution.

Although exemplary embodiments have been shown and described, it will be clear to those of ordinary skill in the art that a number of changes, modifications, or alterations to the disclosure as described may be made. All such changes, modifications, and alterations should therefore be seen as within the scope of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A device for polishing an optical surface, the device comprising:
   a flexible substrate that is conformable to a lens, the flexible substrate comprising a front side for facing a lens, the flexible substrate further comprising a back side for coupling with a lens-polishing device;
   a cushion located on the back side of the flexible substrate;
   diamond particles, comprising:
      at least ninety-five percent (95%) fine diamond particles, each fine diamond particle having a particle size that is between approximately 0.5 micrometers (µm) and approximately 5.0 µm; and
      at most five percent (5%) coarse diamond particles, each coarse abrasive particle having a particle size that is greater than approximately 5.0 µm; and
   a water-insoluble binder on the front side of the flexible substrate, the water-insoluble binder binding the diamond particles to the flexible substrate.

2. The device of claim 1, the water-insoluble binder comprising an epoxy.

3. The device of claim 1, the water-insoluble binder comprising a polyurethane.

4. A device for polishing an optical surface, the device comprising:
   a flexible substrate that is conformable to a lens, the flexible substrate comprising a front side for facing a lens, the flexible substrate further comprising a back side for coupling with a lens-polishing device;
   a cushion located on the back side of the flexible substrate;
   aluminum oxide particles, comprising:
      at least ninety-five percent (95%) fine aluminum oxide particles, each fine aluminum oxide particle having a particle size that is between approximately 0.5 micrometers (µm) and approximately 5.0 µm; and
      at most five percent (5%) coarse aluminum oxide particles, each coarse aluminum oxide particle having a particle size that is greater than approximately 5.0 µm; and
   a water-insoluble binder on the front side of the flexible substrate, the water-insoluble binder binding the aluminum oxide particles to the flexible substrate.

5. The device of claim 4, the water-insoluble binder comprising an epoxy.

6. The device of claim 4, the water-insoluble binder comprising a polyurethane.

7. A device for polishing an optical surface, the device comprising:
   a flexible substrate that is conformable to a lens, the flexible substrate comprising a front side for facing a lens, the flexible substrate further comprising a back side for coupling with a lens-polishing device;
   a cushion located on the back side of the flexible substrate;
   silicon carbide particles, comprising:
      at least ninety-five percent (95%) fine silicon carbide particles, each fine silicon carbide particle having a particle size that is between approximately 0.5 micrometers (μm) and approximately 5.0 μm; and at most five percent (5%) coarse silicon carbide particles, each coarse silicon carbide particle having a particle size that is greater than approximately 5.0 μm; and a water-insoluble binder on the front side of the flexible substrate, the water-insoluble binder binding the abrasive particles to the flexible substrate.

8. The device of claim 7, the water-insoluble binder comprising an epoxy.

9. The device of claim 7, the water-insoluble binder comprising a polyurethane.

10. A device for polishing an optical surface, the device comprising:

a flexible substrate that is conformable to a lens, the flexible substrate comprising a front side for facing a lens, the flexible substrate further comprising a back side for coupling with a lens-polishing device;

a cushion located on the back side of the flexible substrate;

cerium oxide particles, comprising:

at least ninety-five percent (95%) fine cerium oxide particles, each fine cerium oxide particle having a particle size that is between approximately 0.5 micrometers (μm) and approximately 5.0 μm; and at most five percent (5%) coarse cerium oxide particles, each coarse cerium oxide particle having a particle size that is greater than approximately 5.0 μm; and a water-insoluble binder on the front side of the flexible substrate, the water-insoluble binder binding the cerium oxide particles to the flexible substrate.

11. The device of claim 10, the water-insoluble binder comprising an epoxy.

12. The device of claim 10, the water-insoluble binder comprising a polyurethane.

* * * * *